(12) United States Patent
Liu et al.

(10) Patent No.: US 10,006,594 B2
(45) Date of Patent: Jun. 26, 2018

(54) LED LAMP COMPATIBLE WITH ELECTRONIC BALLAST

(71) Applicant: MLS Co., Ltd., Guangdong Province (CN)

(72) Inventors: Tianming Liu, Zhongshan (CN); Yuqing Liu, Zhongshan (CN); Jianli Gao, Zhongshan (CN); Hu Xiao, Zhongshan (CN); Pei Zhang, Zhongshan (CN); Meixian Tu, Zhongshan (CN); Hongli Shi, Zhongshan (CN); Yaoping Guo, Zhongshan (CN)

(73) Assignee: MLS CO., LTD., Zhongshan City, Guangdong Province (CN)

( * ) Notice: Subject to any disclaimer, the term of this patent is extended or adjusted under 35 U.S.C. 154(b) by 0 days. days.

(21) Appl. No.: 15/011,734

(22) Filed: Feb. 1, 2016

(65) Prior Publication Data

US 2018/0142841 A1     May 24, 2018

(30) Foreign Application Priority Data

Nov. 25, 2015   (CN) .......................... 2015 1 0830742

(51) Int. Cl.
*F21K 9/278*      (2016.01)
*F21V 23/06*      (2006.01)
*H05B 33/08*      (2006.01)

(52) U.S. Cl.
CPC .............. *F21K 9/278* (2016.08); *F21V 23/06* (2013.01); *H05B 33/0842* (2013.01)

(58) Field of Classification Search
CPC ...... F21K 9/278; F21V 23/06; H05B 33/0842
See application file for complete search history.

(56) References Cited

U.S. PATENT DOCUMENTS

| | | | |
|---|---|---|---|
| 2004/0095078 A1* | 5/2004 | Leong ................ | H05B 33/0809 315/291 |
| 2004/0189218 A1* | 9/2004 | Leong ................ | H05B 33/0803 315/291 |
| 2005/0281030 A1* | 12/2005 | Leong ................ | F21V 23/0471 362/234 |
| 2007/0228999 A1* | 10/2007 | Kit ...................... | H05B 33/0803 315/291 |
| 2013/0119896 A1* | 5/2013 | Fukano .............. | H01R 13/7175 315/312 |
| 2014/0132167 A1* | 5/2014 | Nickles .............. | H05B 33/0815 315/200 R |
| 2015/0241000 A1* | 8/2015 | Barnetson ............... | F21V 3/062 362/294 |

* cited by examiner

*Primary Examiner* — Mary Ellen Bowman
(74) *Attorney, Agent, or Firm* — Ming Chow; Sinorica, LLC

(57) ABSTRACT

Disclosed is a LED lamp compatible with electronic ballast. The positive and negative electrodes of LED array are connected with two pins of lamp via four diodes respectively, by this way, regardless of which pin is connected to the positive electrode, the lamp circuit can form a conductive path to power for the LED array, and consumers can install the lamp without distinguishing the positive and negative electrodes, improving the efficiency of LED lamp replacement.

6 Claims, 1 Drawing Sheet

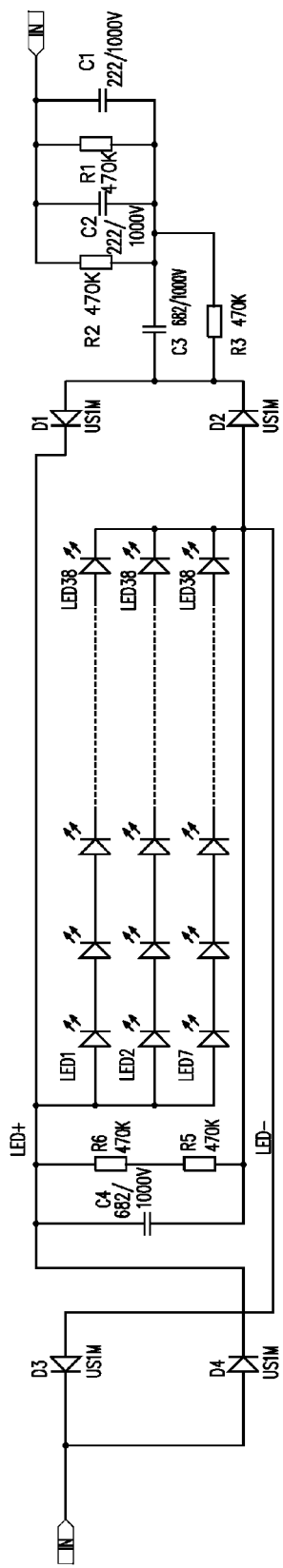

LED LAMP COMPATIBLE WITH ELECTRONIC BALLAST

FIELD OF THE INVENTION

The present invention relates to the technical field of LED lamp, and in particular, to a LED lamp compatible with electronic ballast.

BACKGROUND OF THE INVENTION

With the popularization of LED technology, LED lamps have been widely used. However, as most of the lighting power supply equipments (such as lamp bases) are left from traditional lightings and if these lighting power supply equipments are placed, it is undoubtedly a huge loss. For this reason, many LED lighting is designed to match with traditional lighting power supply equipments.

Lamp is an important lighting device in the traditional field of lighting. In many places, lamp bases matching with traditional lamps are provided. The sockets used o fix the lamp pin are provided on both ends of the lamp base, and electronic ballasts are provided inside the lamp base. The electronic ballast can convert the mains supply to direct current supply for the sockets on both ends. As no distinction between the positive electrode and negative electrode for the fluorescent lamp, the lamp can be energized when the lamp pin is inserted to the socket of the lamp base.

In order to maximize the use of traditional lamp bases, many lighting products in LED industry are designed as lamp shape. However, LED needs to distinguish the positive electrode and negative electrode, there is a problem when the lamp made of LED is used: it is easy to connect the positive and negative electrodes reversely when LED lamp is inserted to the lamp base, causing LED lamp unable to work normally. To this end, usually it is required to dismantle the ballasts of lamp base, and replace them with LED power switch driver module, but it will undoubtedly increase the cost of installation.

SUMMARY OF THE INVENTION

The object of the invention is to overcome the shortcoming in prior art and provide a kind of electronic ballast that can be compatible with the existing lamp base, to avoid distinguishing the positive electrode and negative electrode when installation of LED lamp.

The present invention is achieved through the following technical solutions:

The invention provides a LED lamp compatible with electronic ballast, comprising a LED array, a first pin and a second pin, wherein the positive electrode of the LED array is connected to the cathode of diode D1 and the cathode of diode D3 respectively, the anode of diode D1 is connected to the first pin, the anode of diode D3 connected to the second pin, the negative electrode of the LED array is connected to the anode of diode D2 and the anode of diode D4 respectively, the cathode of diode D2 is connected to the first pin and the cathode of diode D4 is connected to the second pin.

The first pin and the second pin comprises two contact pins, and the two contact pins of the first pin are short connected, and the two contact pins of the second pin are short connected.

The junctions of the anode of diode D1 and the cathode of diode D2 is connected to the first pin via a current-limiting circuit.

The current-limiting circuit comprises resistors and capacitors mutually connected in parallel.

A filter circuit is connected between the positive electrode and negative electrode of LED array.

The filter circuit comprises resistors and capacitors mutually connected in parallel.

The present invention can achieve the following beneficial effect: the invention provides a LED lamp compatible with electronic ballast. The positive and negative electrodes of LED array are connected with two pins of lamp via four diodes respectively, by this way, regardless of which pin is connected to the positive electrode, the lamp circuit can form a conductive path to power for the LED array, and consumers can install the lamp without distinguishing the positive and negative electrodes, improving the efficiency of LED lamp replacement.

BRIEF DESCRIPTION OF THE DRAWINGS

The invention is further described in combination with drawings and embodiments, but the embodiments do not constitute any restriction on the invention. Those technicians skilled in the art can obtain other drawings according to the following drawing without any creative work.

FIG. 1 shows the schematic diagram of a LED lamp compatible with electronic ballasts.

DETAILED DESCRIPTION OF THE EMBODIMENTS

The invention is further described in combination with embodiments.

Referring to FIG. 1, the invention provides a LED lamp compatible with electronic ballast, comprising a LED array, a first pin and a second pin. A filter circuit is connected between the positive electrode and negative electrode of the LED array. The positive electrode of the LED array is connected to the cathode of diode D1 and the cathode of diode D3 respectively, the anode of diode D1 is connected to the first pin, the anode of diode D3 is connected to the second pin, the negative electrode of the LED array is connected to the anode of diode D2 and the anode of diode D4 respectively, and the cathode of diode D2 is connected to the first pin and the cathode of diode D4 is connected to the second pin. The junctions of the anode of diode D1 and the cathode of diode D2 are connected to the first pin via a current-limiting circuit.

In actual applications, the first pin and the second pin comprises two contact pins, and the two contact pins of the first pin are short connected, and the two contact pins of the second pin are short connected.

Referring to FIG. 1, the filter circuit comprises the resistor R5, the resistor R6 and the capacitor C4. The resistor R5 and resistor R6 are connected in series, and then connected with the capacitor C4 in parallel.

The current-limiting circuit comprises the resistor R1, resistor R2, resistor R3, capacitor C1, capacitor C2 and capacitor C3. The resistor R1, resistor R2, capacitor C1, capacitor C2 are connected in series to each other, which constitutes the first current-limiting circuit. The resistor R3 and capacitor C3 constitute the second current-limiting circuit. The first current-limiting circuit is connected with the second current-limiting circuit in series each other.

After the alternating current is converted to a high frequency alternating current by electronic ballast, it can limit the current on both ends of the LED through the capacitive reactance generating from nonpolarized capacitors C1, C2, C3 under a certain AC signal frequency. The resistors R1, R2, R3 connected in parallel on both ends of capacitors C1, C2, C3 can discharge the electric charges of C1, C2, C3 when the power source is cut off, to prevent the voltage superposition after charging of capacitor that may cause increase in output voltage and burning of LED. The limited current can be converted to stable direct current after rectification of D1, D2, D3, D4 and filtering of C4, to provide power supply for LED.

The foregoing invention has been described in detail by way of illustration and example for purposes of clarity and understanding. As is readily apparent to one skilled in the art, the foregoing are only some of the methods and compositions that illustrate the embodiments of the foregoing invention. It will be apparent to those of ordinary skill in the art that variations, changes, modifications and alterations may be applied to the compositions and/or methods described herein without departing from the true spirit, concept and scope of the invention.

What is claimed is:

1. A LED lamp compatible with electronic ballast, comprising a LED array, a first pin and a second pin, wherein the positive electrode of the LED array is connected to the cathode of diode D1 and the cathode of diode D3 respectively, the anode of diode D1 is connected to the first pin, the anode of diode D3 connected to the second pin, the negative electrode of the LED array is connected to the anode of diode D2 and the anode of diode D4 respectively, the cathode of diode D2 is connected to the first pin and the cathode of diode D4 is connected to the second pin.

2. The LED lamp compatible with electronic ballast according to claim 1, wherein the first pin and the second pin comprises two contact pins, and the two contact pins of the first pin are short connected, and the two contact pins of the second pin are short connected.

3. The LED lamp compatible with electronic ballast according to claim 1, wherein the junctions of the anode of diode D1 and the cathode of diode D2 is connected to the first pin via a current-limiting circuit.

4. The LED lamp compatible with electronic ballast according to claim 3, wherein the current-limiting circuit comprises resistors and capacitors mutually connected in parallel.

5. The LED lamp compatible with electronic ballast according to claim 1, wherein a filter circuit is connected between the positive electrode and negative electrode of LED array.

6. The LED lamp compatible with electronic ballast according to claim 5, wherein the filter circuit comprises resistors and capacitors mutually connected in parallel.

* * * * *